US007520449B2

(12) United States Patent
Matsuo et al.

(10) Patent No.: US 7,520,449 B2
(45) Date of Patent: Apr. 21, 2009

(54) ELECTROMAGNETIC FUEL INJECTION VALVE

(75) Inventors: Daisuke Matsuo, Miyagi (JP); Tomoyuki Omura, Miyagi (JP); Eisaku Sakata, Miyagi (JP)

(73) Assignee: Keihin Corporation, Tokyo (JP)

( * ) Notice: Subject to any disclaimer, the term of this patent is extended or adjusted under 35 U.S.C. 154(b) by 259 days.

(21) Appl. No.: 11/659,134

(22) PCT Filed: Sep. 22, 2005

(86) PCT No.: PCT/JP2005/017453

§ 371 (c)(1),
(2), (4) Date: Feb. 1, 2007

(87) PCT Pub. No.: WO2006/035657

PCT Pub. Date: Apr. 6, 2006

(65) Prior Publication Data

US 2007/0251505 A1 Nov. 1, 2007

(30) Foreign Application Priority Data

Sep. 27, 2004 (JP) ............................ 2004-280182

(51) Int. Cl.
*F02M 51/06* (2006.01)
*F02M 51/00* (2006.01)
*F16K 31/02* (2006.01)
*B05B 1/30* (2006.01)

(52) U.S. Cl. ............. 239/585.5; 239/585.1; 239/585.4; 251/129.15; 251/129.21

(58) Field of Classification Search ... 239/585.1–585.5; 251/129.01, 129.15, 129.16, 129.2, 129.21; 123/476, 472
See application file for complete search history.

(56) References Cited

U.S. PATENT DOCUMENTS 4,944,486 A * 7/1990 Babitzka ................ 251/129.21

(Continued)

FOREIGN PATENT DOCUMENTS

JP 2-241971 A 9/1990

(Continued)

*Primary Examiner*—Darren W Gorman
(74) *Attorney, Agent, or Firm*—Arent Fox LLP

(57) ABSTRACT

In an electromagnetic fuel injection valve in which a coil assembly is housed within a solenoid housing, an inlet tube is provided coaxially and integrally so as to be connected to the rear end of a fixed core, and the solenoid housing and at least a front part of the inlet tube are covered by a synthetic resin covering section having an integral power-receiving coupler, the resin-molded section (7) includes a first resin-molded layer (41) and a second resin-molded layer (42), the first resin-molded layer (41) being formed from a glass fiber-incorporated synthetic resin while forming a coupler main portion (40*a*) that defines a framework part of the power-receiving coupler (40), and the second resin-molded layer (42) being formed from a synthetic resin into which glass fiber is not incorporated so as to cover the first resin-molded layer (41), and in a section of the inlet tube (32) on the fixed core (23) side, when the thickness of the first resin-molded layer (41) is t1, the thickness of the second resin-molded layer (42) is t2, and the thickness of the inlet tube (32) is t3, they are set so that t1<t3≦t2. This can improve the rigidity of a part of the inlet tube connected to the fixed core and suppress the generation of operating noise effectively, particularly in a high frequency region.

4 Claims, 3 Drawing Sheets

U.S. PATENT DOCUMENTS

| | | | | |
|---|---|---|---|---|
| 5,236,174 | A * | 8/1993 | Vogt et al. | 251/129.21 |
| 5,494,224 | A * | 2/1996 | Hall et al. | 239/585.5 |
| 5,996,911 | A * | 12/1999 | Gesk et al. | 239/585.1 |
| 2001/0045473 | A1* | 11/2001 | Landschoot et al. | 239/585.1 |
| 2004/0188552 | A1* | 9/2004 | Saito et al. | 239/585.1 |

FOREIGN PATENT DOCUMENTS

| | | | |
|---|---|---|---|
| JP | 5-503976 | A | 6/1993 |
| JP | 2004-76700 | A | 3/2004 |
| JP | 2004-293313 | A | 10/2004 |
| JP | 2005-256640 | A | 9/2005 |

* cited by examiner

ELECTROMAGNETIC FUEL INJECTION VALVE

CROSS-REFERENCE TO RELATED APPLICATION

This application is a National Stage entry of International Application No. PCT/JP2005/017453, filed Sept. 22, 2005, the entire specification claims and drawings of which are incorporated herewith by reference.

TECHNICAL FIELD

The present invention relates to an electromagnetic fuel injection valve and, in particular, an electromagnetic fuel injection valve in which a cylindrical magnetic body forming a part of a valve housing having a valve seat on a front end part thereof is joined, via a coaxial cylindrical non-magnetic body, to a front part of a cylindrical fixed core, a coil assembly surrounding a rear part of the cylindrical magnetic body, the cylindrical non-magnetic body, and the fixed core is housed within a solenoid housing formed from a flange portion protruding radially outward from the rear end of the fixed core and a coil case that is formed in a cylindrical shape having an end wall at one end and has opposite ends magnetically coupled to the cylindrical magnetic body and the flange portion, a fuel filter is mounted on a rear part of an inlet tube that is coaxially and integrally provided so as to be connected to the rear end of the fixed core and that forms a fuel passage, and at least a front part of the inlet tube and the solenoid housing are covered by a synthetic resin-molded section having an integral power-receiving coupler, a power-receiving connecting terminal connected to a coil of the coil assembly facing the power-receiving coupler.

BACKGROUND ART

Such an electromagnetic fuel injection valve is already known from, for example, Patent Publication 1.

Patent Publication 1: Japanese Patent Application Laid-open No. 2004-76700

DISCLOSURE OF INVENTION

Problems to be Solved by the Invention

The resin-molded section of the electromagnetic fuel injection valve disclosed in Patent Publication 1 above is formed from one type of synthetic resin. However, the resin-molded section covering the solenoid housing and at least the front part of the inlet tube section is required not only to have a function of suppressing the outward radiation of operating noise occurring from the solenoid housing but also to have a high strength since it is necessary for the power-receiving coupler to have a relatively high strength in order to enhance the reliability of an electrical connection, but it is difficult to form a resin-molded section having sufficient strength while suppressing the operating noise sufficiently using a single type of synthetic resin such as that disclosed in Patent Publication 1 above.

The present applicant has proposed an electromagnetic fuel injection valve in which a resin-molded section that is formed by double layer molding from a first resin-molded layer whose strength is increased by incorporating glass fiber and a second resin-molded layer that can suppress the transmission of operating noise by not incorporating glass fiber (Japanese Patent Application No. 2004-53691).

However, in the above-mentioned proposed technique, the thicknesses of the first and second molded layers are set to be larger than the thickness of a portion, closer to a fixed core, of an inlet tube coaxially connected to the rear end of the fixed core, and it cannot be said that the rigidity of a part of the inlet tube connected to the fixed core is sufficient; due to the insufficient rigidity an impact accompanying opening/closing operations of a valve body within a valve housing is transmitted to the first resin-molded layer via the inlet tube, and transmission by the glass fiber within the first resin-molded layer makes a power-receiving coupler and a fuel distribution tube connected to the inlet tube vibrate, thus causing operating noise, particularly that having a high frequency, to be generated.

The present invention has been accomplished under the above-mentioned circumstances, and it is an object thereof to provide an electromagnetic fuel injection valve that can improve the rigidity of a part of an inlet tube connected to a fixed core and suppress the generation of operating noise effectively, particularly in a high frequency region.

Means of Solving the Problems

In order to attain the above object, according to a first aspect of the present invention, there is provided an electromagnetic fuel injection valve in which a cylindrical magnetic body forming a part of a valve housing having a valve seat on a front end part thereof is joined, via a coaxial cylindrical non-magnetic body, to a front part of a cylindrical fixed core, a coil assembly surrounding a rear part of the cylindrical magnetic body, the cylindrical non-magnetic body, and the fixed core is housed within a solenoid housing formed from a flange portion protruding radially outward from the rear end of the fixed core and a coil case that is formed in a cylindrical shape having an end wall at one end and has opposite ends magnetically coupled to the cylindrical magnetic body and the flange portion, a fuel filter is mounted on a rear part of an inlet tube that is coaxially and integrally provided so as to be connected to the rear end of the fixed core and that forms a fuel passage, and at least a front part of the inlet tube and the solenoid housing are covered by a synthetic resin-molded section having an integral power-receiving coupler, a power-receiving connecting terminal connected to a coil of the coil assembly facing the power-receiving coupler, characterized in that the resin-molded section comprises a first resin-molded layer and a second resin-molded layer, the first resin-molded layer being formed from a glass fiber-incorporated synthetic resin while forming a coupler main portion that defines a framework part of the power-receiving coupler, and the second resin-molded layer being formed from a synthetic resin into which glass fiber is not incorporated so as to cover the first resin-molded layer, and in a section of the inlet tube on the fixed core side, when the thickness of the first resin-molded layer is t1, the thickness of the second resin-molded layer is t2, and the thickness of the inlet tube is t3, they are set so that $t1<t3\leqq t2$.

According to a second aspect of the present invention, in addition to the arrangement of the first aspect, a front half of the inlet tube on the fixed core side is covered by the first resin-molded layer, and the second resin-molded layer is formed so as to directly cover the inlet tube to the rear of a section covered by the first resin-molded layer.

According to a third aspect of the present invention, in addition to the arrangement of the first or second aspect, an inwardly recessed curved face is formed on a portion where the inlet tube and the flange portion at the rear end of the fixed core are connected.

Further, according to a fourth aspect of the present invention, in addition to the arrangement of the first or second aspect, the fixed core, the flange portion, and the inlet tube are formed by integral grinding so that in the axial direction the cross section is always circular.

Effects of the Invention

In accordance with the arrangement of the first aspect of the present invention, since the resin-molded section has the double layer structure that includes the first resin-molded layer and the second resin-molded layer, and the first resin-molded layer is formed from the glass fiber-incorporated synthetic resin, by forming the coupler main portion, which defines the framework part of the power-receiving coupler, from the first resin-molded layer, a strength that can ensure the reliability of an electrical connection can be imparted to the resin-molded section; furthermore, since the second resin-molded layer covering the first resin-molded layer is formed from the synthetic resin containing no glass fiber, the generation of operating noise can be suppressed effectively. Moreover, since, in the portion of the inlet tube on the fixed core side, the thickness of the inlet tube is greater than the thickness of the first resin-molded layer, the rigidity of the part of the inlet tube connected to the fixed core can be enhanced, the transmission of vibration from the inlet tube to the first resin-molded layer can be suppressed, the transmission of vibration by the glass fiber contained in the first resin-molded layer can be suppressed by reducing the thickness of the first resin-molded layer, and the generation of operating noise in a high frequency region in particular can be suppressed effectively. Moreover, since the thickness of the second resin-molded layer, which does not contain glass fiber, is greater than the thickness of the first resin-molded layer and is equal to or greater than the thickness of the inlet tube, vibration can be absorbed effectively by the second resin-molded layer, thus further suppressing the generation of operating noise.

Furthermore, in accordance with the arrangement of the second aspect of the present invention, by making a section covered with the first resin-molded layer, which contains glass fiber, as small as possible, the transmission of vibration can be suppressed, thus suppressing the generation of operating noise more effectively.

In accordance with the arrangement of the third aspect of the present invention, the rigidity of the part of the inlet tube connected to the fixed core can be further enhanced, the transmission of vibration from the inlet tube to the first resin-molded layer side can be suppressed to a lower level, and the generation of operating noise, particularly in a high frequency region, can be suppressed effectively while shortening the fuel injection valve in the axial direction.

Furthermore, in accordance with the arrangement of the fourth aspect of the present invention, by integrally grinding the fixed core, the flange portion, and the inlet tube the rigidity of the components can be further enhanced and, moreover, since in the axial direction the cross section is always circular, it is unnecessary to carry out additional machining, thus giving an advantage in terms of cost.

EXPLANATION OF REFERENCE NUMERALS AND SYMBOLS

7 Resin-Molded Section
8 Valve Seat
9 Valve Housing
11 Coil Assembly
12 Solenoid Housing
13 Cylindrical Magnetic Body
23 Fixed Core
23*a* Flange Portion
25 Cylindrical non-magnetic Body
29 Coil
31 Coil Case
31*a* End Wall
32 Inlet Tube
33 Fuel Filter
34 Fuel Passage
38 Power-Receiving Connecting Terminal
40 Power-Receiving Coupler
40*a* Coupler Main Portion
41 First Resin-Molded Layer
42 Second Resin-Molded Layer
47 Curved Face

BEST MODE FOR CARRYING OUT THE INVENTION

A mode for carrying out the present invention is explained below by reference to an embodiment of the present invention shown in the attached drawings.

Embodiment 1

Figure 1:
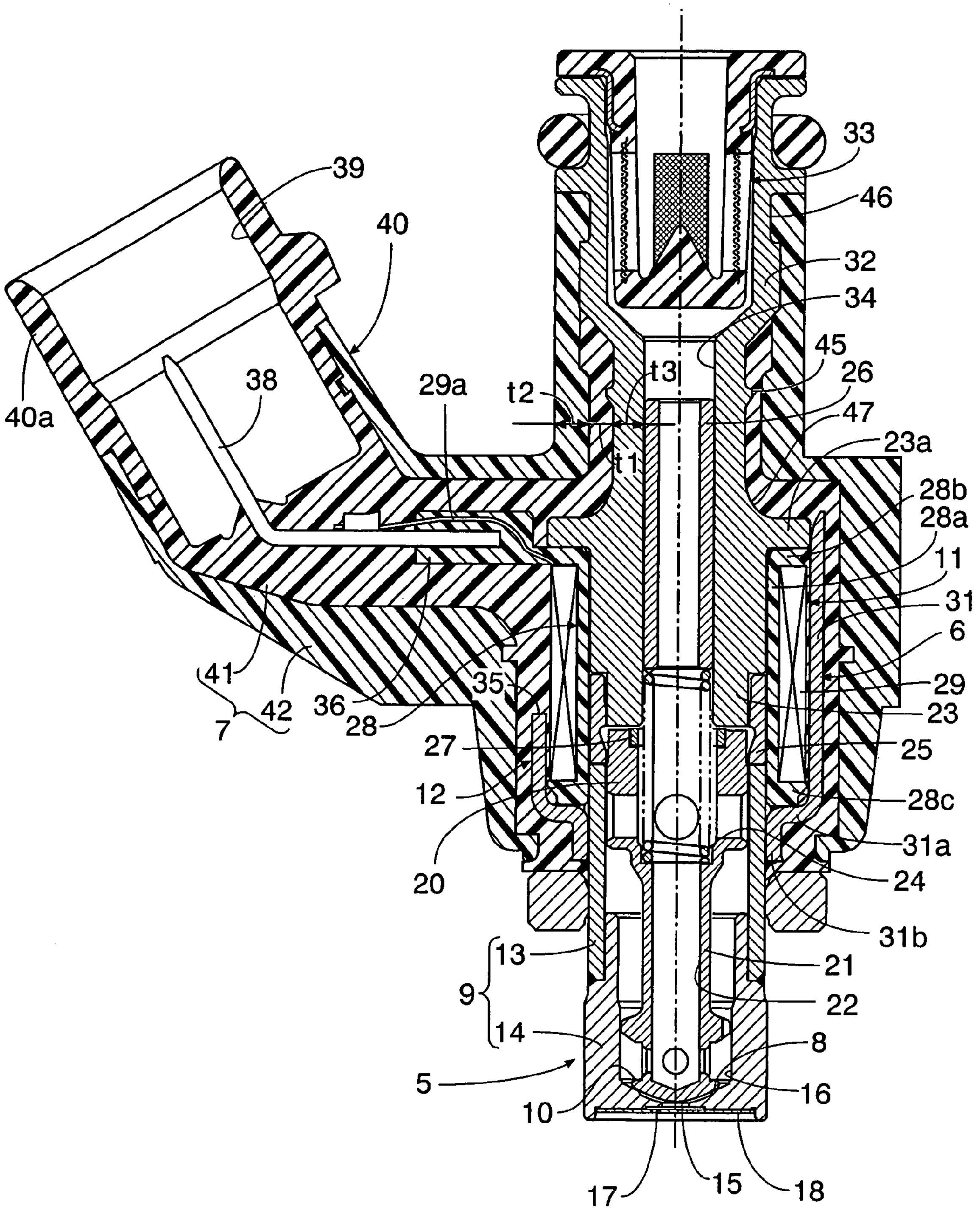
FIG. 1 is a vertical sectional view of an electromagnetic injection valve (first embodiment).

Referring firstly to FIG. 1, an electromagnetic fuel injection valve for injecting fuel into an engine (not illustrated) includes a valve operating section 5 in which a valve body 10 is housed within a valve housing 9 having a valve seat 8 on a front end part, the valve body 10 being spring-biased in a direction that seats the valve body 10 on the valve seat 8, a solenoid section 6 in which a coil assembly 11 is housed in a solenoid housing 12 provided so as to be connected to the valve housing 9, the coil assembly 11 being capable of exhibiting an electromagnetic force for driving the valve body 10 so as to make it separate from the valve seat 8, and a resin-molded section 7 made of a synthetic resin covering at least the solenoid section 6 and having an integral power-receiving coupler 40, power-receiving connecting terminals 38 connected to a coil 29 of the coil assembly 11 facing the power-receiving coupler 40.

The valve housing 9 is formed from a cylindrical magnetic body 13 made of a magnetic metal and a valve seat member 14 that is joined in a liquid-tight manner to the front end of the cylindrical magnetic body 13. The valve seat member 14 is welded to the cylindrical magnetic body 13 in a state in which a rear end portion of the valve seat member 14 is fitted into a front end portion of the cylindrical magnetic body 13, and this valve seat member 14 is coaxially provided with a fuel outlet hole 15 opening on the front end face thereof, a tapered valve seat 8 extending from the inner end of the fuel outlet hole 15, and a guide hole 16 extending from a large diameter portion at the rear end of the valve seat 8. An injector plate 18 made of steel plate is welded in a liquid-tight manner along its entire periphery to the front end of the valve seat member 14, the injector plate 18 having a plurality of fuel injection holes 17 communicating with the fuel outlet hole 15.

A movable core 20 is slidably fitted into a rear portion of the valve housing 9, the movable core 20 forming part of the solenoid section 6, and the valve body 10, which can be seated on the valve seat 8 so as to block the fuel outlet hole 15, is formed integrally with the front end of a valve shaft 21 integrally connected to the movable core 20. A through hole 22 is formed coaxially in the movable core 20, the valve shaft 21, and the valve body 10, the through hole 22 communicating with the interior of the valve housing 9 and having a bottomed shape with its front end blocked.

The solenoid section 6 includes the movable core 20, a cylindrical fixed core 23 facing the movable core 20, a return spring 24 exhibiting a spring force that urges the movable core 20 away from the fixed core 23, a coil assembly 11 disposed so as to surround a rear portion of the valve housing 9 and the fixed core 23 while being capable of exhibiting an electromagnetic force that allows the movable core 20 to be attracted to the fixed core 23 side against the spring force of the return spring 24, and a solenoid housing 12 surrounding the coil assembly 11 so that a front end portion of the solenoid housing 12 is connected to the valve housing 9.

The rear end of the cylindrical magnetic body 13 of the valve housing 9 is coaxially joined to a front portion of the fixed core 23 via a cylindrical non-magnetic body 25, which is formed from a non-magnetic metal such as stainless steel, the rear end of the cylindrical magnetic body 13 is butt-welded to the front end of the cylindrical non-magnetic body 25, and the rear end of the cylindrical non-magnetic body 25 is welded to the fixed core 23 in a state in which the front portion of the fixed core 23 is fitted into the cylindrical non-magnetic body 25.

A cylindrical retainer 26 is press-fitted into the fixed core 23 and fixed by swaging, and the return spring 24 is disposed between the retainer 26 and the movable core 20. Furthermore, in order to avoid the movable core 20 from making direct contact with the fixed core 23, a ring-shaped stopper 27 made of a non-magnetic material is fitted into and fixed to the inner periphery of a rear end portion of the movable core 20 so that the ring-shaped stopper 27 projects slightly from a rear end face of the movable core 20 toward the fixed core 23. Furthermore, the coil assembly 11 is formed by winding a coil 29 around a bobbin 28 surrounding a rear portion of the valve housing 9, the cylindrical non-magnetic body 25, and the fixed core 23.

The solenoid housing 12 is formed from a coil case 31 and a flange portion 23*a*, the coil case 31 being made of a magnetic metal in a cylindrical shape having at one end an annular end wall 31*a* facing an end portion of the coil assembly 11 on the valve operating section 5 side and surrounding the coil assembly 11, the flange portion 23*a* protruding radially outward from a rear end portion of the fixed core 23 and facing an end portion of the coil assembly 11 on the side opposite to the valve operating section 5, and the flange portion 23*a* being magnetically coupled to the other end portion of the coil case 31. Moreover, a tubular mating portion 31*b* is coaxially provided on the inner periphery of the end wall 31*a* of the coil case 31, the cylindrical magnetic body 13 of the valve housing 9 being fitted into the tubular mating portion 31*b*, the solenoid housing 12 is provided so as to be connected to the valve housing 9 by fitting the valve housing 9 into the tubular mating portion 31*b*, and one end of the coil case 31 is magnetically coupled to the cylindrical magnetic body 13.

A cylindrical inlet tube 32 is integrally and coaxially connected to the rear end of the fixed core 23, and a fuel filter 33 is mounted on a rear portion of the inlet tube 32. Moreover, a fuel passage 34 is coaxially provided in the inlet tube 32, the retainer 23, and the fixed core 23, the fuel passage 34 communicating with the through hole 21 of the movable core 20.

The resin-molded section 7 is formed so as to embed not only the coil assembly 11 and the solenoid housing 12 of the solenoid section 6 but also a part of the valve housing 9 and at least a front part of the inlet tube 32 while filling in a gap between the solenoid housing 12 and the coil assembly 11, and a cutout portion 35 is provided in the coil case 31 of the solenoid housing 12, the cutout portion 35 allowing a terminal boss 36 formed integrally with the bobbin 28 of the coil assembly 11 to be disposed outside the solenoid housing 12.

The power-receiving coupler 40, which forms a recess 39, is provided integrally with the resin-molded section 7, the power-receiving connecting terminals 38 connected to opposite ends of the coil 29 of the coil assembly 11 facing the recess 39, the base end of the connecting terminal 38 being embedded in the terminal boss 36, and coil ends 29*a* of the coil 29 being electrically attached to the power-receiving connecting terminals 38.

The resin-molded section 7 is formed by double layer molding of a first resin-molded layer 41 and a second resin-molded layer 42, the first resin-molded layer 41 forming a coupler main portion 40*a* that defines a framework of the power-receiving coupler 40, and the second resin-molded layer 42 covering the first resin-molded layer 41 so that the outer periphery of the power-receiving coupler 40 is exposed from a middle part up to the extremity of the power-receiving coupler 40. In this embodiment, the entirety of the solenoid section 6, a rear part of the valve housing 9, and part of the inlet tube 32 are covered by the first resin-molded layer 41, and the second resin-molded layer 42, which covers the first resin-molded layer 41, is formed so that the outer periphery of the first resin-molded layer 41 is exposed from the middle part up to the extremity of the power-receiving coupler 40, and a front end part of the first resin-molded layer 41 is slightly exposed. Moreover, whereas a front half, on the fixed core 23 side, of the inlet tube 32 is covered by the first resin-molded layer 42, the second resin-molded layer 42 is formed so as to directly cover the inlet tube 32 to the rear of the section covered by the first resin-molded layer 41.

Furthermore, an annular projection 45 is integrally and projectingly provided on an outer face of a middle part, close to the fixed core 23, of the inlet tube 32, the annular projection 45 being embedded in the first resin-molded layer 41, and an annular channel 46 is provided on an outer face, close to the rear, of the inlet tube 32, an end part of the second resin-molded layer 42 engaging with the annular channel 46.

The first and second resin-molded layers 41 and 42 are formed from synthetic resins that are different from each other, but whereas the first resin-molded layer 41 is formed from a glass fiber-incorporated synthetic resin such as, for example, a liquid crystal polymer, the second resin-molded layer 42 is formed from a synthetic resin having a lower bending strength than that of the first resin-molded layer 41; for example, the first resin-molded layer 41 is formed from a glass fiber-incorporated liquid crystal polymer, and the second resin-molded layer 42 is formed from a synthetic resin into which glass fiber is not incorporated, such as, for example, the thermoplastic polyester elastomer Hytrel (product name, manufacture by DuPont, USA).

Figure 2:
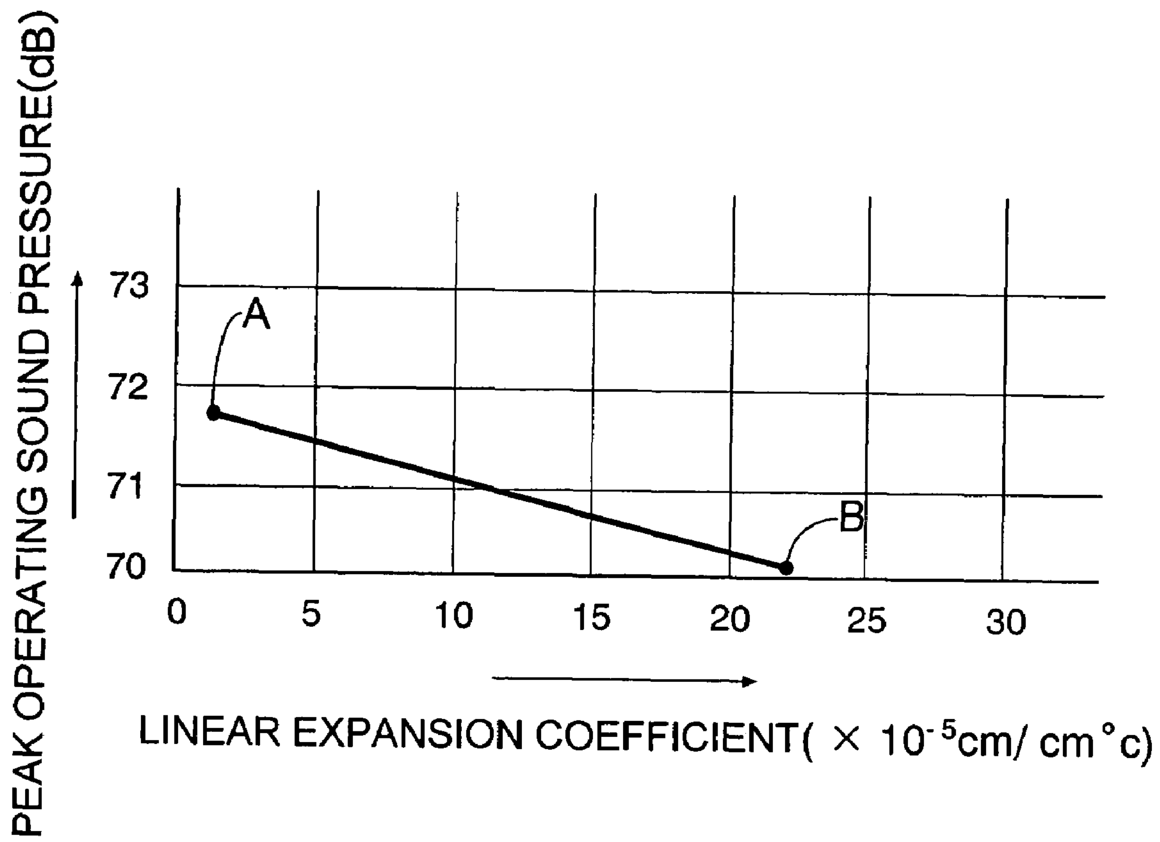
FIG. 2 is a diagram showing the relationship between bending strength and peak operating sound pressure for a glass fiber-incorporated liquid crystal polymer and a thermoplastic polyester elastomer (first embodiment).

The relationship between bending strength and peak operating sound pressure generated from the resin-molded section 7 when the entire resin-molded section 7 is formed from a liquid crystal polymer into which glass fiber is incorporated at, for example, 35% is shown by point A in FIG. 2, and the liquid crystal polymer has relatively suppressed function of transmitting operating noise and is highly rigid. On the other hand, when the entire resin-molded section 7 is formed from a thermoplastic polyester elastomer into which glass fiber is not incorporated, the generation of operating noise can be suppressed effectively by virtue of the excellent flexibility of the thermoplastic polyester elastomer, and as shown by point B in FIG. 2, although the bending strength becomes lower compared with that of the liquid crystal polymer, the peak operating sound pressure can be suppressed to a low level.

In accordance with the present invention, in a section of the inlet tube 32 on the fixed core 23 side, that is, a section further toward the fixed core 23 side than the annular projection 45 in this embodiment, when the thickness of the first resin-molded layer 41 is t1, the thickness of the second resin-molded layer 42 is t2, and the thickness of the inlet tube 32 is t3, the thicknesses t1, t2, and t3 are set so that $t1<t3\leqq t2$.

An inwardly recessed curved face 47 is formed on a part where the inlet tube 32 and the flange portion 23*a* at the rear end of the fixed core 23 are connected, and the fixed core 23, the flange portion 23, and the inlet tube 32 are integrally ground so that in the axial direction the cross section is always circular.

The operation of this embodiment is now explained. The resin-molded section 7 is formed by double layer molding of the first resin-molded layer 41 and the second resin-molded layer 42, the first resin-molded layer 41 being formed from a glass fiber-incorporated synthetic resin so as to cover at least the solenoid section 6 and form the coupler main portion 40*a*, which defines the framework of the power-receiving coupler 40, and the second resin-molded layer 42 being formed from a synthetic resin containing no glass fiber and covering the first resin-molded layer 41 so that the first resin-molded layer 41 is exposed from the middle part up to the extremity of the power-receiving coupler 40.

The connections between the coil 29 of the coil assembly 11 and the power-receiving connecting terminals 38 are therefore covered by the first resin-molded layer 41, and a strength that can ensure the reliability of the electrical connections can be imparted to the resin-molded section 7 by forming the coupler main portion 40*a*, which defines the framework of the power-receiving coupler 40, from the first resin-molded layer 41. Furthermore, the second resin-molded layer 42 covering the first resin-molded layer 41 is formed from the synthetic resin containing no glass fiber, generation of operating noise can be suppressed effectively and, compared with an arrangement in which the entirety of a fuel injection valve is covered by a soundproofing cover, the entire electromagnetic fuel injection valve can be made compact. Moreover, since up to the middle part of the power-receiving coupler 40 is formed by double layer molding, generation of operating noise from the power-receiving coupler 40 can be reduced effectively by the second resin-molded layer 42 while obtaining a strength required for the power-receiving coupler 40 by virtue of the first resin-molded layer 41.

Moreover, in the part of the inlet tube 32 on the fixed core 23 side, since the thickness t3 of the inlet tube 32 is greater than the thickness t1 of the first resin-molded layer 41, the rigidity of the part of the inlet tube 32 connected to the fixed core 23 is enhanced, the transmission of vibration from the inlet tube to the first resin-molded layer 41 can be suppressed, and the transmission of vibration by means of glass fiber contained in the first resin-molded layer 41 can be suppressed by reducing the thickness t1 of the first resin-molded layer 41, thus suppressing the generation of operating noise effectively, particularly in a high frequency region. Furthermore, since the thickness t2 of the second resin-molded layer 42 containing no glass fiber is greater than the thickness t1 of the first resin-molded layer and is equal to or greater than the thickness t3 of the inlet tube 32, vibration can be absorbed by the second resin-molded layer 42 effectively, thereby further suppressing the generation of operating noise.

Furthermore, since the inwardly recessed curved face 47 is formed on the part where the inlet tube 32 and the flange portion 23*a* at the rear end of the fixed core 23 are connected, the rigidity of the part of the inlet tube 32 connected to the fixed core 23 can be further enhanced, and the transmission of vibration from the inlet tube 32 to the first resin-molded layer 41 side can be further suppressed to a low level while shortening the fuel injection valve in the axial direction, thereby suppressing the generation of operating noise more effectively, particularly in a high frequency region.

Figure 3:
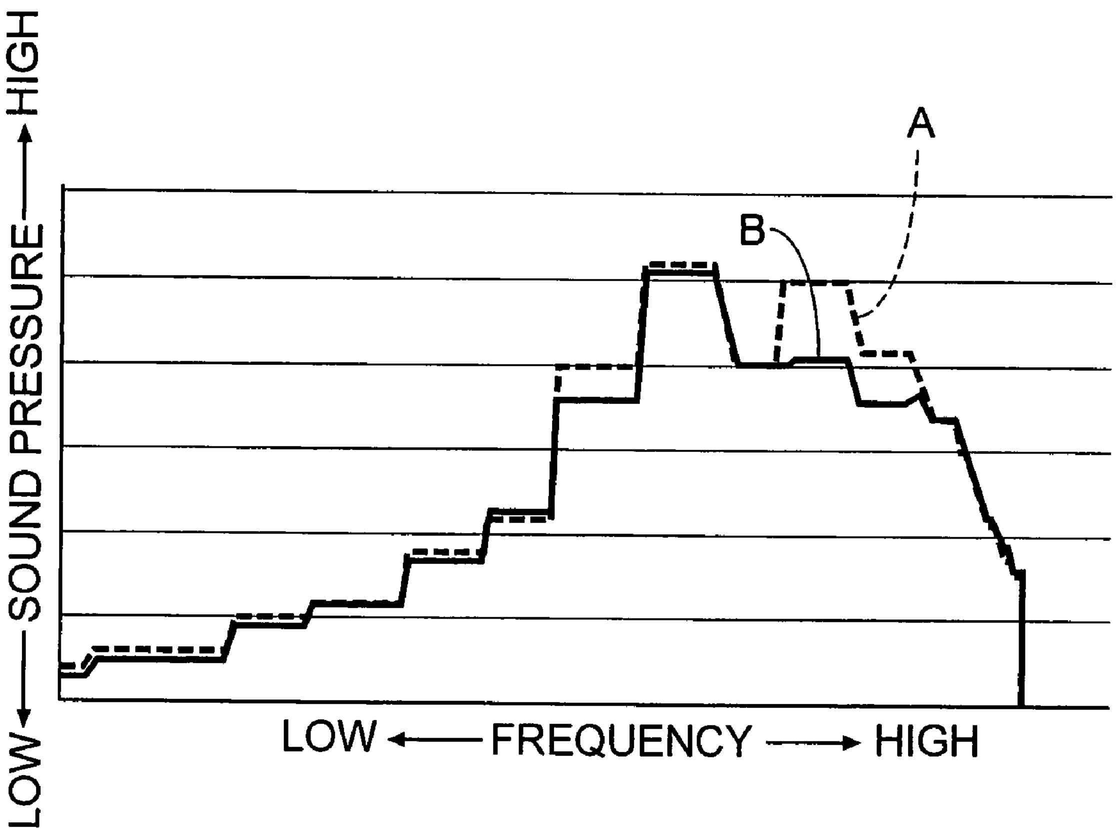
FIG. 3 is a diagram showing change in sound pressure with respect to frequency (first embodiment).

The change in sound pressure with respect to frequency when the part of the inlet tube 32 connected to the flange portion 23 is a right angle and the thickness t3 of the inlet tube 32 is smaller than the thickness t1 of the first resin-molded layer 41 is shown by A in FIG. 3; the change in sound pressure with respect to frequency when, in accordance with the present invention, the curved face 47 is formed on the part of the inlet tube 32 connected to the flange portion 23, the thickness t3 of the inlet tube 32 is greater than the thickness t1 of the first resin-molded layer 41, and the thickness t2 of the second resin-molded layer 42 is equal to or greater than the thickness t3 of the inlet tube 32 is shown by B in FIG. 3, and it is clear that by making the thickness t3 of the inlet tube 32 greater than the thickness t1 of the first resin-molded layer 41 and forming the curved face 47 on the part where the flange portion 23*a* and the inlet tube 32 are connected, the sound pressure level in a high frequency region can be reduced.

Furthermore, whereas the front half of the inlet tube 32 on the fixed core 23 side is covered by the first resin-molded layer 42, the second resin-molded layer 42 is formed so as to directly cover the inlet tube 32 to the rear of the section covered by the first resin-molded layer 41, and it is therefore possible to suppress the transmission of vibration by minimizing the section covered by the first resin-molded layer 41, which contains glass fiber, thus suppressing the generation of operating noise more effectively.

Moreover, by integrally grinding the fixed core 23, the flange portion 23*a*, and the inlet tube 32, the rigidity of the components can be further enhanced and, moreover, since in the axial direction the cross section is always circular, it is unnecessary to carry out additional machining, thus giving an advantage in terms of cost.

An embodiment of the present invention is explained above, but the present invention is not limited to the above-mentioned embodiment and can be modified in a variety of ways as long as it does not depart from the spirit and scope of the present invention described in the claims.

The invention claimed is:

1. An electromagnetic fuel injection valve in which a cylindrical magnetic body (13) forming a part of a valve housing (9) having a valve seat (8) on a front end part thereof is joined, via a coaxial cylindrical non-magnetic body (25), to a front part of a cylindrical fixed core (23), a coil assembly (11) surrounding a rear part of the cylindrical magnetic body (13), the cylindrical non-magnetic body (25), and the fixed core (23) is housed within a solenoid housing (12) formed from a flange portion (23*a*) protruding radially outward from the rear end of the fixed core (23) and a coil case (31) that is formed in a cylindrical shape having an end wall (31*a*) at one end thereof and has opposite ends magnetically coupled to the cylindrical magnetic body (13) and the flange portion (23*a*), a fuel filter (33) is mounted on a rear part of an inlet tube (32) that is coaxially and integrally provided so as to be connected to the rear end of the fixed core (23) and that forms a fuel passage (34), and at least a front part of the inlet tube (32) and the solenoid housing (12) are covered by a synthetic resin-molded section (7) having an integral power-receiving coupler (40), a power-receiving connecting terminal (38) connected to a coil (29) of the coil assembly (11) facing the power-receiving coupler (40), characterized in that the resin-molded section (7) comprises a first resin-molded layer (41) and a second resin-molded layer (42), the first resin-molded layer (41) being formed from a glass fiber-incorporated synthetic resin while forming a coupler main portion (40*a*) that defines a framework part of the power-receiving coupler (40), and the second resin-molded layer (42) being formed from a synthetic resin into which glass fiber is not incorporated so as to cover the first resin-molded layer (41), and in a section of the inlet tube (32) on the fixed core (23) side, when the thickness of the first resin-molded layer (41) is t1, the thickness of the second resin-molded layer (42) is t2, and the thickness of the inlet tube (32) is t3, they are set so that $t1<t3\leqq t2$.

2. The electromagnetic fuel injection valve according to claim 1, wherein a front half of the inlet tube (32) on the fixed core (23) side is covered by the first resin-molded layer (41), and the second resin-molded layer (42) is formed so as to directly cover the inlet tube (32) to the rear of a section covered by the first resin-molded layer (41).

3. The electromagnetic fuel injection valve according to either claim 1 or 2, wherein an inwardly recessed curved face (47) is formed on a portion where the inlet tube (32) and the flange portion (23*a*) at the rear end of the fixed core (23) are connected.

4. The electromagnetic fuel injection valve according to either claim 1 or 2, wherein the fixed core (23), the flange portion (23*a*), and the inlet tube (32) are formed by integral grinding so that in the axial direction the cross section is always circular.

* * * * *